United States Patent [19]
Kamiya et al.

[11] Patent Number: 5,170,990
[45] Date of Patent: Dec. 15, 1992

[54] VACUUM VALVE AND A VACUUM TREATING APPARATUS IN WHICH SAID VACUUM VALVE IS USED

[75] Inventors: Osamu Kamiya, Machida; Masao Ueki, Urayasu, both of Japan

[73] Assignee: Canon Kabushiki Kaisha, Tokyo, Japan

[21] Appl. No.: 721,546

[22] PCT Filed: Nov. 30, 1990

[86] PCT No.: PCT/JP90/01560
§ 371 Date: Jul. 25, 1991
§ 102(e) Date: Jul. 25, 1991

[87] PCT Pub. No.: WO91/08412
PCT Pub. Date: Jun. 13, 1991

[30] Foreign Application Priority Data
Dec. 1, 1989 [JP] Japan .................................. 1-310510

[51] Int. Cl.⁵ .............................................. E03B 11/00
[52] U.S. Cl. .................................... 251/210; 137/907; 137/576
[58] Field of Search ................ 251/210; 137/907, 576

[56] References Cited
U.S. PATENT DOCUMENTS

| | | | |
|---|---|---|---|
| 4,070,001 | 1/1978 | Musgrove | 137/907 |
| 4,212,317 | 7/1980 | Patrick et al. | 137/576 |
| 4,239,061 | 12/1980 | Peterson | 251/210 |

FOREIGN PATENT DOCUMENTS

| | | | |
|---|---|---|---|
| 132890 | 11/1978 | Fed. Rep. of Germany | 137/907 |
| 59-17302 | 4/1984 | Japan. | |
| 442342 | 12/1975 | U.S.S.R. | 251/210 |

Primary Examiner—A. Michael Chambers
Attorney, Agent, or Firm—Fitzpatrick, Cella, Harper & Scinto

[57] ABSTRACT

A vacuum valve includes a first sealing member in contact with the space on a low pressure side of a space shut-off of the vacuum valve is composed of an inorganic material, and a second sealing member in contact with the space on the high pressure side is composed of an elastomer. The sealing state of the vacuum valve is made adjustable in two steps such that the first sealing member and the second sealing member are closed in the first sealing step and in the second sealing step the first sealing member is closed and the second sealing member is open.

6 Claims, 9 Drawing Sheets

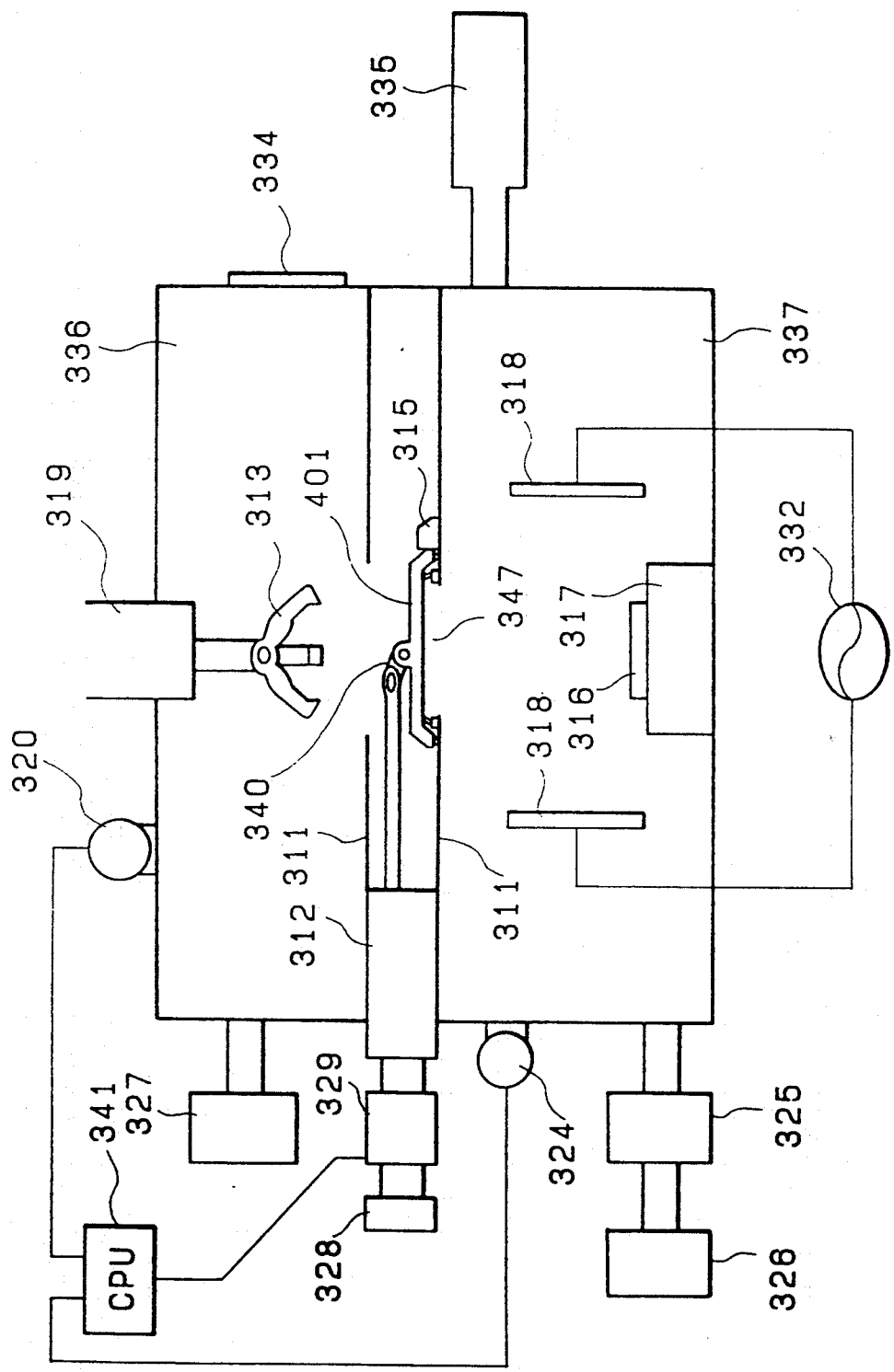

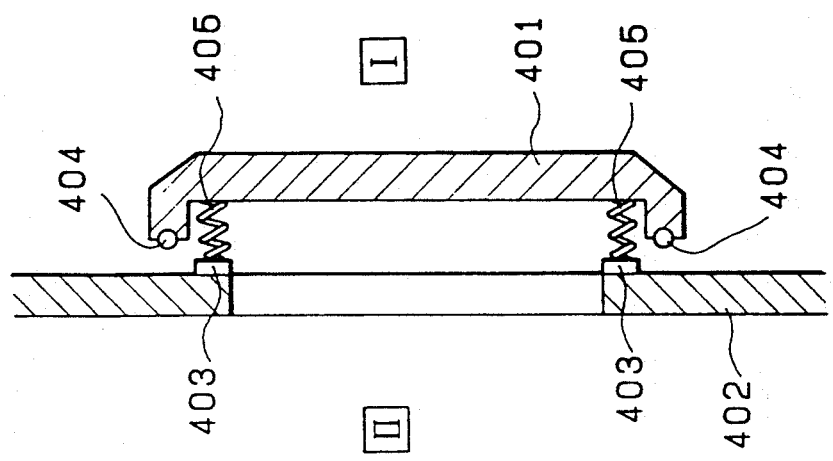
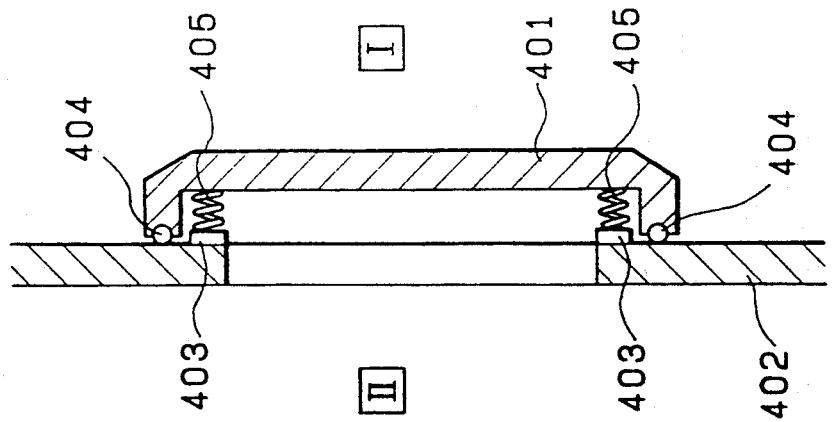

VACUUM VALVE AND A VACUUM TREATING APPARATUS IN WHICH SAID VACUUM VALVE IS USED

THE FIELD TO WHICH THE INVENTION PERTAINS

The present invention relates to a vacuum valve having a structure capable of controlling a sealed state in two steps and a vacuum treating apparatus in which said vacuum valve is used.

BACKGROUND OF THE INVENTION

Various vacuum treatments in vacuum are essential in the production of semiconductor elements such as an integrated circuit (IC), a light emitting diode (LED), etc. For instance, film-formation for the formation of a semiconductor and etching thereof are carried out in the production of an IC. Such film-formation and etching are required to be carried out in a clean space. For this, prior to commencement of respective reaction processes, it is necessary to sufficiently evacuate a vacuum treating chamber to be in a clean state and to prevent the evacuated vacuum treating chamber from being contaminated with impurities such as atmospheric components.

In view of this, there has been proposed such a vacuum treating apparatus as shown in FIG. 10.

The vacuum treating apparatus shown in FIG. 10 comprises a substrate treating chamber 1000 and a substrate supplying chamber 1002. The substrate supplying chamber 1002 is connected through a vacuum valve 1001 comprising an O-ring made of an elastomer to the treating chamber 1000.

A substrate transporting system 1003 is connected to the substrate supplying chamber 1002, and the substrate transporting system 1003 is provided with a substrate supporting device 1004. The substrate supporting device 1004 is configured such that a substrate can be transported into the treating chamber 1000 under a vacuum condition. The treatment of the substrate in the vacuum treating apparatus is performed in the following manner. That is, a substrate to be treated is entered in the substrate supplying chamber 1002 through the substrate supporting device 1004, followed by sufficiently evacuating the substrate supplying chamber 1002. Then, the substrate is transported into the treating chamber 1000 by opening the vacuum valve 1001 and operating the substrate transporting system 1003. Thereafter, film formation or etching treatment is performed to the substrate in the treating chamber 1000. For this apparatus, in order to prevent the treating chamber 1000 from being contaminated with atmospheric air and to maintain the inside of the treating chamber 1000 in a clean state at the time of entering the substrate in the substrate supplying chamber 1002, the inside of the treating chamber 1000 is required to be maintained in a vacuumed state. For this, the substrate supplying chamber 1002 is isolated from the treating chamber 1000 through the vacuum valve 1001 comprising the O-ring made of an elastomer.

Now, the elastomer member to be used for the vacuum valve of the vacuum apparatus releases impurity gases such as $CH_4$, $H_2O$, $CO_2$, etc. which usually cause negative effects for the vacuum process under vacuum environment. For example, in the case of the film-forming process for a Si semiconductor, when $CH_4$, $CO_2$, etc. are adhered to the surface of a Si film, there is caused SiC, and when $H_2O$ is adhered, there is caused SiO. As a result, the resulting device becomes such that it is poor in characteristics or is accompanied with increased defects. In consequence, it is desired not to use an elastomer in the treating chamber 1000. Thus, there have been made proposals of replacing the elastomer by other members.

Specifically, as a first example, there is a proposal of using a metal wire instead of the above elastomer. In this case, sealing is performed by using a soft metal (sealing metal wire) and a hard metal (stainless steel for the valve seat and valve element) in combination and utilizing a permanent deformation of the soft metal caused upon contact of the valve seat with the valve element. However, such permanent deformation of the soft metal easily reaches a deformation limit in a narrow circular contacting portion between the valve seat and the valve element and because of this, there is a problem that the life of the valve is shortened. Further, there is also a problem that the sealed surface is apt to be damaged with dust or the like to cause contamination of gases. For these reasons, the valve in which a metal wire is used is poor in durability, and its application is limited to a specific use purpose.

As a second example, there is a proposal of using a springy copper alloy or stainless steel as a sealing member. This proposal is to perform sealing utilizing the springing property among the hard alloys. Accordingly, in this case, there is an advantage that the life of the valve is prolonged upon use in a deformation extent less than the elastic limit of the sealing member. However, there is a problem that it is remarkably costly to seal the entire circular contacting portion without leaving any space, since the roughness and the degree of parallelization for the sealing face of each of the sealing members, valve seat and valve element are necessary to be treated with extreme precision. Further, it is necessary to make the imposing pressure markedly large in order to completely seal the entire sealing face since the springing property of a hard metal is utilized. In addition, as well as in the case of the first example, dust deposited on the sealing face is apt to cause damage. In addition to these problems, there is also other problem that although the durability against repetition of opening and closing is good, its handling is difficult and it is costly.

As a third example, there is proposed a double sealing type valve having the structure shown in FIG. 9 by Unexamined Japanese Patent Publication 59(1984)-17302. This is configured such that not only sealing efficiency is improved but also gases released from the elastomer due to vacuum environment are properly treated by way of performing double sealing with the use of a metal sealing member and an elastomer sealing member, and performing gas exhaustion through the intermediate space between them. Shown in FIG. 9 is a view in which the sealed portion of the valve element is enlarged. In this figure, the valve is in an opened state.

In the case of the valve shown in FIG. 9, a valve element 901 is provided with an elastomer sealing member 904, and elastomer seal 905 is formed by pressing the elastomer sealing member 904 to a valve seat 902. And, metal seal 903 is formed by pressing a plane face of the valve element 901 to a plane face of the valve seat 902. There is formed an intermediate space 906 between the elastomer sealing member 904 and the metal seal 903.

This intermediate space 906 is connected to an exhaust pump 908 externally positioned through a passageway 907 being connected to said intermediate space. And, gas released from the elastomer sealing member 904 is exhausted through the intermediate space 906 by means of the exhaust pump 908.

For this third example, there is an advantage that repetition durability and resistance to dust are good. However, there is a problem that the apparatus obtained becomes unavoidably costly because it is necessary to provide the exhaust pump 908 as an external device and it is required to form the passageway 907 in the valve seat 902. In addition, there is also a problem for this vacuum valve that the elastomer seal 905 is unavoidably formed as the metal seal 903 is formed, and because of this, deformation and deterioration are markedly caused on the elastomer sealing member 904, wherein should the elastomer sealing member be replaced by a new one, it takes a period of some tens hours in order to depressurize from atmospheric pressure to the original ultra-high vacuum state in the case of a ultra-high vacuum treating apparatus.

SUMMARY OF THE INVENTION

The present invention makes it a principal object to eliminate the foregoing various problems in the known vacuum valve and to provide a vacuum valve which excels in durability and operation efficiency and which is inexpensive.

Another object of the present invention is to eliminate the problems in a vacuum apparatus which are caused due to use of the known vacuum valve and to provide a vacuum apparatus which makes it possible to constantly obtain a highly clean vacuum atmosphere and which excels in operation efficiency.

The present invention has been accomplished as a result of extensive studies by the present inventors in order to solve the foregoing various problems caused due to the known vacuum valve and to attain the above objects.

The vacuum valve to be provided according to the present invention is of the following constitution.

That is, it is characterized in that a first sealing member in contact with the space on the low pressure side of a space shut-off of the vacuum valve is composed of an inorganic material whereas a second sealing member in contact with the space on the high pressure side is composed of an elastomer; and the sealing state of the vacuum valve is made adjustable in two steps such that said first and second sealing members are closed in the first sealing step and in the second sealing step the first sealing member is closed whereas the second sealing member is open.

The vacuum apparatus to be provided according to the present invention is of the following constitution.

That is, it is a vacuum treating apparatus comprising a first vacuum vessel, a second vacuum vessel capable of providing a pressure state higher than that provided in said first vacuum vessel, a vacuum valve connected to said first vacuum vessel and said second vacuum vessel, said vacuum valve being capable of making the inside of said first vacuum vessel continuous or discontinuous with the inside of said second vacuum vessel, and driving means for driving said vacuum valve, characterized in that said vacuum valve contains two kinds of sealing members, the first sealing member in contact with the space formed by said first vacuum vessel is composed of an inorganic material, the second sealing member in contact with the space formed by said second vacuum vessel is composed of an elastomer, and the sealing state of said vacuum valve is made adjustable in two steps such that said first and second sealing members are closed in the first sealing step, and in the second sealing step, said first sealing member is closed whereas said second sealing member is open.

The use of the vacuum valve having the above constitution according to the present invention makes it possible to establish a desired highly clean vacuum state in the vacuum treating chamber without those problems relating to contamination of gases released from the elastomer which are caused in the case of the known vacuum valve having the sealing member composed of the elastomer only.

In the case of the known vacuum valve having the sealing member composed of an inorganic material only, when the vacuum degree of the space on the high pressure side (less clean) among the spaces shut-off by the vacuum valve is decreased or becomes atmospheric pressure, less clean gas is flown into the space on the low pressure side (highly clean) from the space on the high pressure side (less clean) through the clearance of the contact sealing face of the inorganic material to markedly hinder the vacuum degree (cleanness) of the space on the low pressure side (highly clean).

However, in the vacuum valve of the present invention, there are provided two sealing members at the vacuum sealing portion and only the sealing member in contact with the space on the high pressure side (less clean) is composed of an elastomer. In addition, it is so configured that the closure state of the vacuum valve can be adjusted in two steps, wherein in the first step, the first sealing member and the second sealing member are closed and in the second step, only the first sealing member is closed. Because of this, the pressure of the space on the high pressure side (less clean) becomes high to provide the sealing state of the second step before a pressure difference with the space on the low pressure side (highly clean) becomes distinguishable. By this, it is possible to exhaust gas released from the second sealing member (elastomer sealing member) through the space on the high pressure side (less clean). Moreover in this case, even if a small leak is caused at the sealing portion of the first sealing member (inorganic material sealing member), the influence of the vacuum degree on the high vacuum side is negligibly small in comparison with the gas released from the elastomer sealing member.

Further, in the vacuum valve of the present invention, the elastomer sealing member can be stably maintained without deteriorating for a long period of time. By this, the problems relating to contamination of undesirable gases into the vacuum treating chamber due to deterioration of the elastomer sealing member which are found in the foregoing known double sealed valve are eliminated.

In addition, the apparatus structure is simple, and it is possible to easily provide a desired highly clean vacuum state with a reduced cost.

BRIEF EXPLANATION OF THE DRAWINGS

FIG. 3 is a schematic view illustrating an embodiment of the film-forming apparatus in which the vacuum valve of the present invention is used.

FIG. 4A and FIG. 4B are schematic views illustrating another embodiment of the vacuum valve of the present invention.

DETAILED EXPLANATION OF THE PREFERRED EMBODIMENTS

A detailed embodiment of the vacuum valve having the foregoing constitution according to the present invention is to be explained in the following.

Figure 2A:
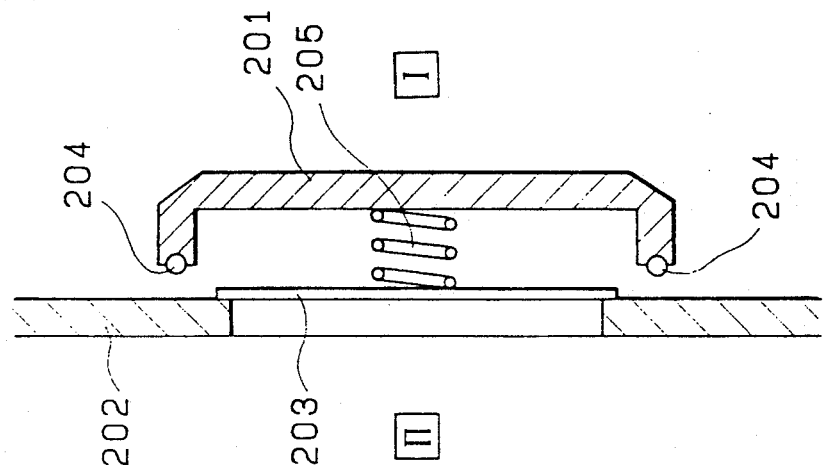
FIG. 2A and FIG. 2B are schematic views illustrating an embodiment of the vacuum valve of the present invention.
Figure 2B:
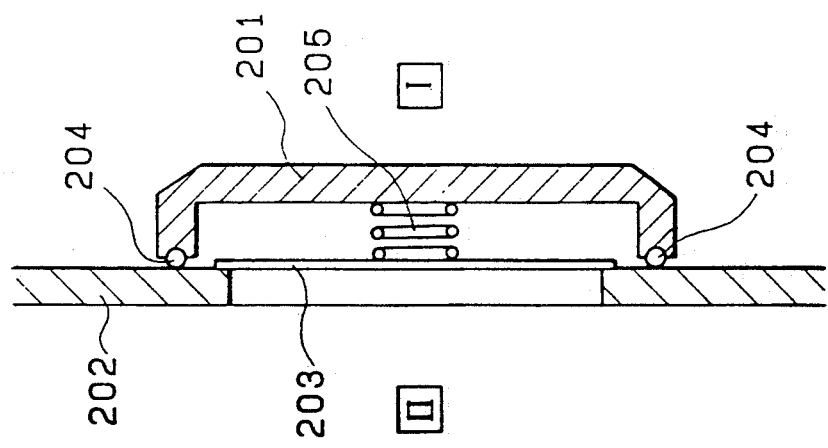

FIG. 2A and FIG. 2B are views for schematically illustrating a preferred embodiment of the vacuum valve according to the present invention.

That is, FIG. 2A illustrates a situation of the vacuum valve of the present invention in a closed, or closure state, wherein the elastomer sealing member and the inorganic material sealing member contact the valve seat (that is, the first sealing step).

In FIG. 2A, a valve element 201 is pressed against a valve seat 202 through an O-ring 204 made of an elastomer situated between the valve seat 202 to establish an elastomer seal and an inorganic material sealing member comprising, for example, a metallic sealing member 203 is pressed against the valve seat 202 by means of a spring 205 to establish a metal seal. In this case, a space I is isolated from a space II through the elastomer seal and the metal seal.

FIG. 2B illustrates a situation in which the space I is isolated from the space II only by the metal seal comprising contact of the metallic sealing member 203 with the valve seat 202 (that is, the second sealing step), wherein the metallic sealing member 203 is pressed against the spring 205 to establish a metal seal.

By the way, as long as the space I is of a pressure of molecular flow region, gas released from the elastomer sealing member 204 is of a negligibly small amount to flow into the space II because the conductance of the metal seal portion is small.

The reason why there is substantially not such an occasion that the gas released from the elastomer sealing member flows into the space II through the metal seal portion is to be explained in the following.

When the conductance showing the flowability of gas under the pressure of molecular flow region between the metallic sealing member 203 and the valve seat 202 is designated by C, the pressure of the space I on the low pressure side is designated by Po, and the pressure of the space II on the high pressure side is designated by P, the amount of gas leaked through the clearance of the seal can be expressed by the following equation.

$$Q = C(P - Po) \quad (1)$$

Here, since Po is smaller than P, there is obtained the following equation.

$$Q \approx CP \quad (2)$$

On the other hand, when the conductance C is made to be L in seal width, the peripheral length of the seal is made to be a, and the size of the clearance is made to be b, there are obtained the following equations.

$$C = 11.6 \, Kab \, (l/sec),$$

$$K = (b/L) \cdot ln(L/b) \quad (3)$$

Wherein a and b are cm units.

Supposing that $P = 10^{-7}$ Torr, $Po = 10^{-10}$ Torr, $a = 30$ cm, $b = 0.001$ cm and $L = 0.5$ cm, the amount Q of gas leaked through the clearance at that time becomes:
$Q = 4.3 \times 10^{-10}$ Torr .l/sec from the equations (2) and (3).

Likewise, when $P = 10^{-10}$ Torr, $Po = 10^{-12}$ Torr, $a = 30$ cm, $b = 0.001$ cm and $L = 0.5$ cm, the result becomes:

$$Q = 4.3 \times 10^{-10} \, Torr \, .l/sec.$$

On the other hand, the amount Q' of gas released from the surface of the elastomer sealing member situated on the high vacuum side can be approximated by the following equation in accordance with W. Beekmann, Vacuum 13 (1963) 349.

$Q' = 1 \times 10^{-8} \times S$ Torr .l/sec, wherein S stands for the surface area of the elastomer sealing member in the space II on the low pressure side.

When consideration is made about the case where an O-ring of 10 cm in diameter is used, the S in this case can be estimated to be about $0.5 \times 30$ cm². Therefore, the result becomes to be:

$$Q' = 1.5 \times 10^{-7} \, Torr \, .l/sec.$$

It is understood that Q is smaller than Q' in any case.

In other words, even in the case when a foreign material of about 10 μ in size is inserted in the seal portion, it is prevented by the released gas corresponding to 1/1000 of the elastomer sealing member when the space I situated on the high pressure side is maintained at $10^{-7}$ Torr.

Further, by this, its effect is improved at a more reduced pressure.

As the inorganic material to be used for the sealing member in the present invention, there can be illustrated, for example, metals such as stainless steel, Al, etc. and ceramics. In a preferred embodiment, there can be illustrated a member prepared by subjecting the surface of a stainless steel to mirror finishing by electrolytic polishing and forming a nonconductive film on the mirror finished surface under clean acidic atmosphere.

As the elastomer, there can be illustrated, for example, fluorine-contained rubbers, NBR rubbers, etc. Other than these, those materials having an elasticity at normal temperature may be properly used.

FIG. 4A and FIG. 4B are views for schematically illustrating another preferred embodiment of the vacuum valve according to the present invention.

The vacuum valve in this embodiment comprises a valve seat 402, a valve element 401, an inorganic material sealing member 403 in the form of an O-ring, an elastomer sealing member 404 and a bellows spring 405.

The inorganic material sealing member 403 comprises a stainless steel having a surface mirror finished by electrolytic polishing on which a nonconductive film having been formed in a clean acidic atmosphere. This sealing member 403 is fixed to the valve element 401 through the bellows spring 405 by way of welding. Its fixing position is situated inside the second sealing member and at the position where the space II on the high vacuum side is sealed. The bellows spring 405 is constituted by stainless steel from which gas is hardly released.

In the present invention, the face of each of the valve seat 402 and the inorganic material sealing member 403 to be in contact is desired to be a flat plane. It is preferably a mechanically ground face, more preferably, a face applied with lapping or an electropolished face.

In this embodiment, the elastomer sealing member 404 is constituted by NBR rubber, and it is fixed to an external portion of the lower end of the valve element 401 so as to seal the space I on the low vacuum side.

In this embodiment, the sealing state can be adjusted in two steps by properly moving the valve element 401 (as the moving means, an air cylinder can be used for example). In the case where the bellows spring 405 is made in a shrunk state, both the sealing member 403 and the sealing member 404 become to be in a closure state (see, FIG. 4A).

On the other hand, when the valve element is risen a bit from the state shown in FIG. 4A, only the sealing member 403 is in a closure state. The noses of the bellows spring 405 are fixed to the valve element 405 at one end and to the sealing member 403 at the other end by way of welding. In this case, the stress caused by moving the valve element 401 up-and-down is chiefly absorbed by the spring portion other than the welded portion. Because of this, the welded portion is never removed.

Figure 5:
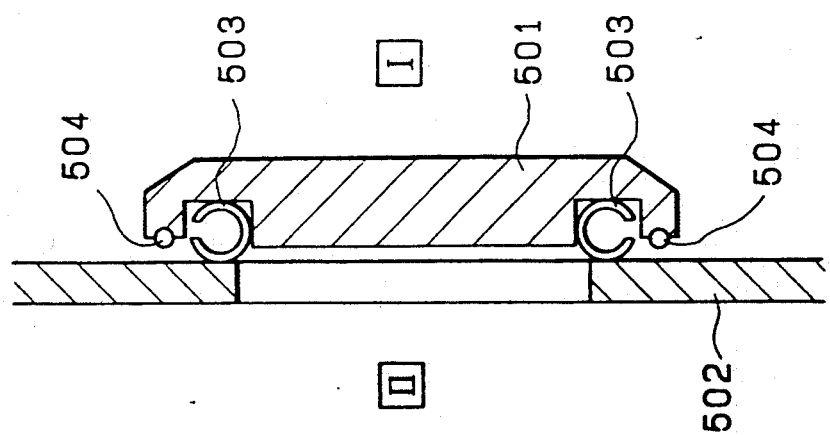

The structure of the inorganic material sealing member is not limited to the foregoing 0-ring structure. As an alternative, it is possible to use an elastic C-shaped ring 503 as shown in FIG. 5.

Figure 6:
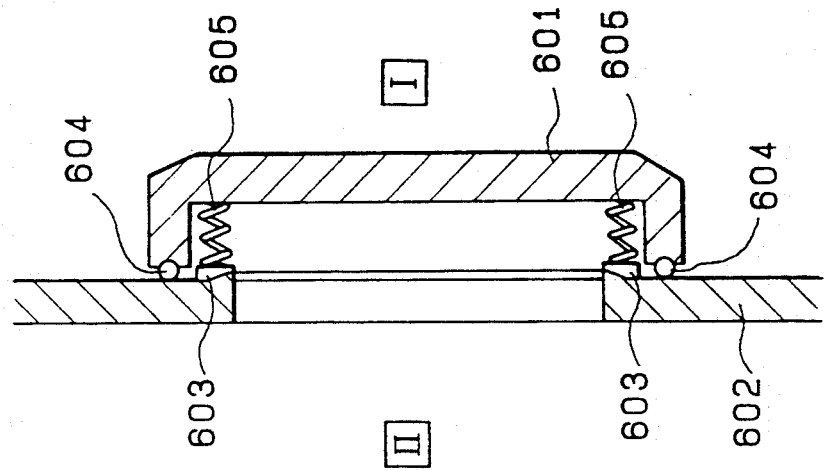
FIG. 5, FIG. 6 and FIG. 7 are schematic views illustrating a further embodiment of the vacuum valve of the present invention.

In this case, when the C-shaped ring is damaged, it can be easily replaced by a new one. Other than this, it is possible for the inorganic material sealing member to be of a tapered structure as shown by numeral 603 in FIG. 6. In this case, the positioning precision of the sealing member is improved. Further in this case, since the contact area to be served for the sealing is widened, the conductance C becomes small to provide an effect of improving the sealing efficiency.

Figure 7:
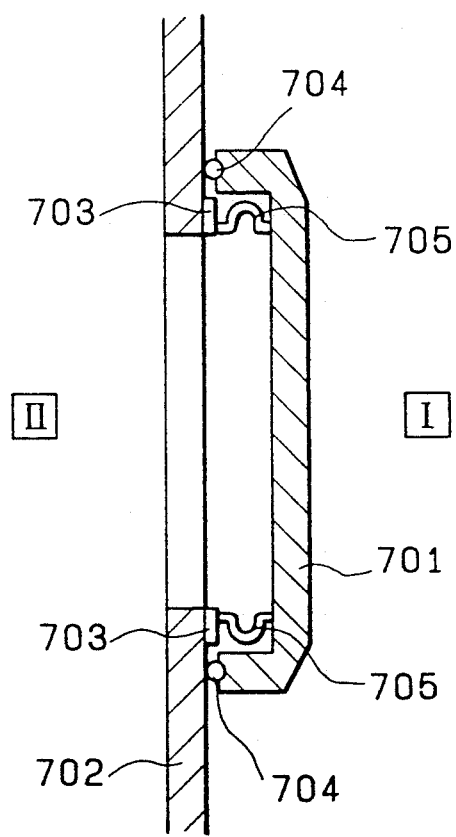

Further in addition, the vacuum valve of the present invention can be of the configuration as shown in FIG. 7 wherein a valve element 701 is connected to an inorganic material sealing member 703 through a spring 705 having a cross-sectional shape of Ω-form.

Shown in FIG. 3 is a deposited film forming apparatus as an example which comprises a vacuum apparatus in which the foregoing vacuum valve of the present invention is employed.

In FIG. 3, numeral 336 stands for a substrate supplying chamber (load lock chamber) for supplying a substrate 316 on which a deposited film is to be formed. Numeral 337 stands for a film-forming chamber. In this apparatus, the film-forming chamber 337 can be maintained at a pressure lower than that in the substrate supplying chamber 336.

In the figure, numeral 401 stands for a valve element of the vacuum valve of the present invention which is connected to an air cylinder 312 through a movable ring 340. Numeral 311 stands for a housing capable of serving also as a valve seat. Numeral reference 315 stands for a stopper. The valve element 401 strikes the stopper 315 by the action of the air cylinder 312 to thereby maintain a switching portion 347 in a closure state. Numeral 329 stands for a controlling system for the air cylinder 312. Numeral 328 stands for a pump.

Explanation is to be made about a film-forming method using this apparatus. Firstly, the substrate supplying chamber 336 and the film-forming chamber 337 are evacuated to be in the second seal state (only the inorganic material sealing member in a closure state). Successively, the vacuum valve is made to be in the first seal state (both the inorganic material sealing member and the elastomer sealing member respectively in a closure state). The inside of the substrate supplying chamber 336 is then brought to atmospheric pressure. Thereafter, the substrate 316 is introduced into the substrate supplying chamber 336 through an entrance 334 of the substrate supplying chamber 336. The substrate 316 is moved below a three-clawed chuck 313 by a moving means (air cylinder for example, not shown here), and it is fitted to the three-clawed chuck 313. The threeclawed chuck 313 herein is connected to a magnetic sliding feedthrough 319, by which the substrate 316 can be transported into the film-forming chamber 337 from the substrate supplying chamber 336.

After this, the inside of the substrate supplying chamber 336 is evacuated by means of a vacuum pump 327, and at the same time, the inside of the film-forming chamber 337 is evacuated by means of a vacuum pump 325. The inside of each of the chambers is brought to a desired vacuum degree while detecting the inner pressure of each of the chambers by pressure gages 320 and 324.

The pressure gages 320 and 324 herein are connected to a CPU 341. The CPU 341 is connected to the air cylinder controlling system 329. That is, it is designed such that the air cylinder 312 can be automatically controlled through the CPU 341 depending on the signals from the pressure gages 320 and 324.

When the pressure of the substrate supplying chamber 336 and the pressure of the film-forming chamber 337 become substantially identical, the valve element 401 is moved through the air cylinder 312 to make the switching portion 347 between the substrate supplying chamber 336 and the film-forming chamber 337 to be in an open state. After this, the three-clawed chuck 313 in which the substrate 316 being caught is moved into the film-forming chamber 337 by using the magnetic sliding feedthrough 319, and the substrate is positioned on a substrate holder 317.

Then, the three-clawed chuck 313 is moved back to the substrate supplying chamber 336. Thereafter evacuation is carried out by using the vacuum valve to make the switching portion 347 such that only the inorganic material sealing member is in a closure state, whereby providing the second seal state. When the inside of the film-forming chamber is brought to a desired pressure, film formation is carried out.

In the figure, numeral 318 stands for an electrode for generating glow discharge, and numeral reference 332 is a RF power source. Numeral reference 335 stands for a gas feed system, and numeral reference 326 stands for a gas treating system for treating gas exhausted through the vacuum pump 325.

In this film-forming chamber 337, it is possible to form a deposited film on the substrate 316 by a conventional method. The substrate 316 on which a deposited film has been formed is returned to the substrate supplying chamber 336 by means of the magnetic sliding feedthrough 319, and it is taken out through the substrate entrance door 334 by using a transporting means (not shown).

Disclosure herein is of the deposited film forming apparatus in which RF power source is used. But it is possible to use other deposited film forming apparatus such as a deposited film forming apparatus in which microwave power source is used.

Figure 1:
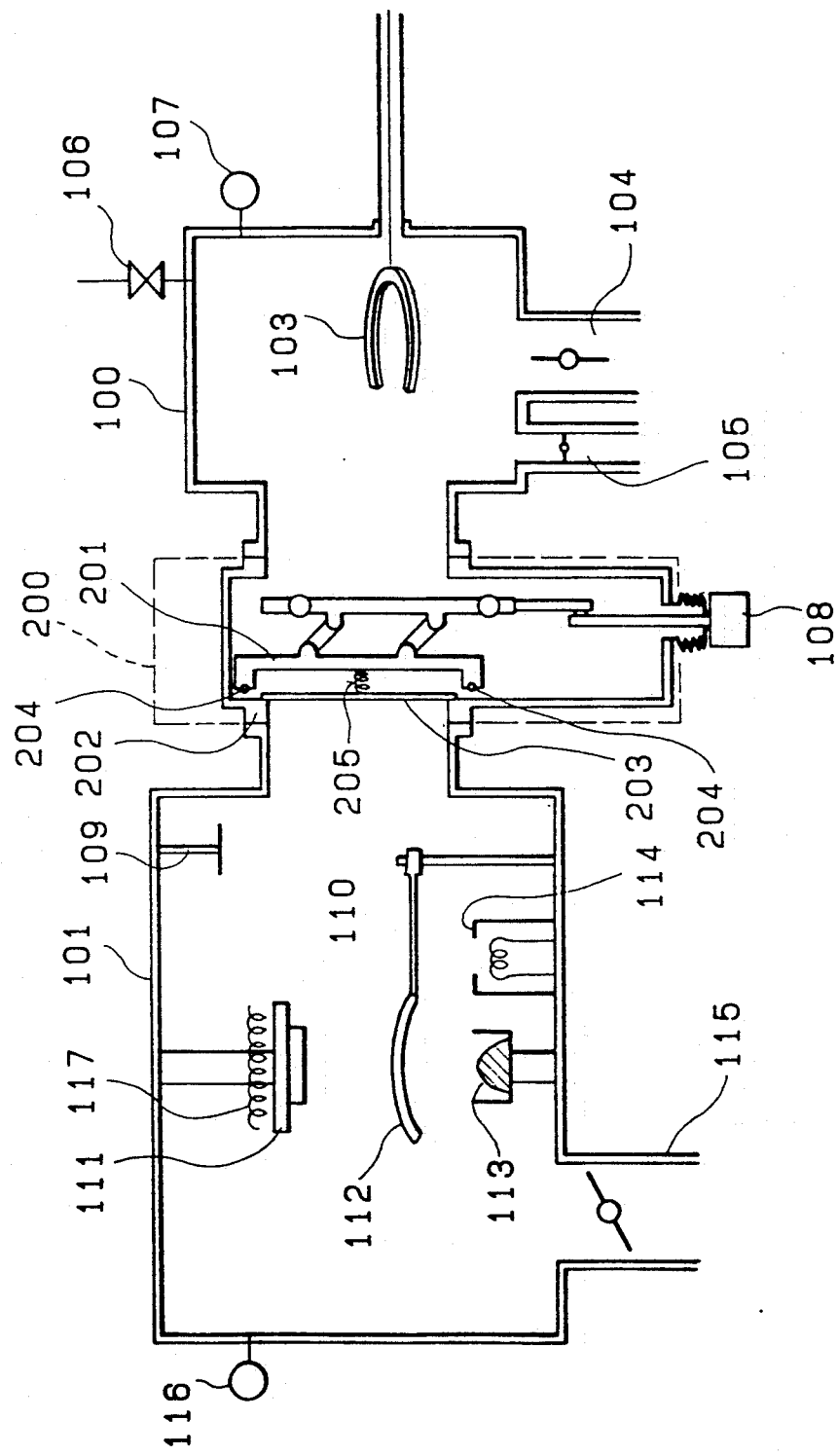
FIG. 1 is a schematic view illustrating an embodiment of the vacuum evaporation apparatus in which the vacuum valve of the present invention is used.

Shown in FIG. 1 is a vacuum evaporation apparatus as an embodiment of the vacuum apparatus having the vacuum valve of the present invention.

In the figure, numeral 201 stands for a valve element having an elastomer sealing member 204, numeral 203 stands for a sealing member composed of a metal, numeral 205 stands for a spring which serves to support the metallic sealing member 203 on the valve element 201 and to let the valve element 201 and the metallic sealing member 203 to independently function one from the other. Numeral reference 202 stands for a valve bonnet capable of serving also as a valve element.

In this embodiment, the elastomer sealing member is constituted by a fluorine-contained rubber (commercially available by the trade name of VITON) and the metallic sealing member 203 is constituted by a stainless steal (SUS 316L).

In FIG. 1, numeral 100 stands for a substrate supplying chamber for supplying a substrate 110 to be treated from atmospheric environment into an evaporation chamber 101. Numeral 103 stands for a transportation device for the substrate. Each of numeral references 104 and 115 stands for a vacuum pump. Numeral 105 stands for a roughing vacuum pump. In the evaporation chamber 101, there are provided an electron gun 114, a shutter 112, an evaporation source 113, a holder 111 for the substrate to be treated, a heater 117 and a film thickness measuring instrument 109. Numeral reference 106 stands for a valve for introducing $N_2$, each of numeral references 107 and 116 stands for a pressure gage, and numeral reference 108 stands for a driving system for performing opening and closing of the vacuum valve.

Explanation is to be made about the performance of the vacuum valve of the present invention in the vacuum evaporation apparatus shown in FIG. 1. The portion encircled by a broken line 200 in the figure illustrates the vacuum valve of the present invention.

(1) The initial state of the evaporation apparatus in FIG. 1

The evaporation chamber 101 is under vacuum evacuation by the vacuum pump 115. The roughing vacuum pump 105 of the substrate supplying chamber 100 is discontinued, whereas the vacuum pump is under operation.

The vacuum valve according to the present invention is made such that the metallic sealing member 203 is in a closure state and the elastomer sealing member is in an open state (the second seal state).

(2) Introduction of the substrate 110 into the substrate supplying chamber 100

The driving system 108 is operated to make the vacuum valve of the present invention to be in the first seal state, particularly, each of the metallic sealing member 203 and the elastomer sealing member 204 to be in a closure state. The valve element 201 is moved leftward in the figure to make the elastomer sealing member 204 contact with the valve seat 202, whereby isolating the substrate supplying chamber 100 from the evaporation chamber 101.

Then, the evacuation by the vacuum pump 104 is suspended. $N_2$ gas is introduced through the valve 106. When the substrate supplying chamber 100 is brought to atmospheric pressure, the introduction of $N_2$ gas is terminated by closing the valve 106. Under this state, a wafer is positioned on the substrate transportation device 103.

(3) Transportation of the substrate into the evaporation chamber

The inside of the substrate supplying chamber 100 is vacuum evacuated by operating the roughing vacuum pump 105. When the pressure in said chamber becomes to be $1 \times 10^{-3}$ Torr, the roughing vacuum pump 105 is discontinued. Successively, the substrate supplying chamber 100 is evacuated by the other pump 104. When the pressure in said chamber becomes $1 \times 10^{-4}$ Torr, the valve element 201 is moved rightward to make the vacuum valve of the present invention to be in the second seal state.

While continuing the evacuation, when the pressure in the substrate supplying chamber 100 reaches $1 \times 10^{-6}$ Torr, the vacuum valve of the present invention is made to be in a fully open state to thereby connect the substrate supplying chamber 100 to the evaporation chamber. Then, the substrate 110 for film deposition is placed on the holder 117 by way of the transportation device 103. When the transportation device 103 returns to the substrate supplying chamber 100, the vacuum valve of the present invention is made to be in the second seal state.

(4) Return of the substrate to the substrate supplying chamber

After completion of film deposition by evaporation, the vacuum valve of the present invention is made to be in a fully open state. The substrate 110 on the holder 117 in the treating chamber 101 is returned to the substrate supplying chamber 100. Then, the vacuum valve of the present invention is made to be in the first seal state. $N_2$ gas is introduced through the valve 106 to bring the substrate supplying chamber to atmospheric pressure, and the substrate 110 having a deposited film thereon is taken outside of the system.

In the above (2), when the substrate supplying chamber 100 is maintained at atmospheric pressure, the vacuum valve of the present invention is in a closure state corresponding to the first seal state and it is hermetically sealed by way of the elastomer seal 204, and because of this, the evaporation chamber 101 prevents atmospheric components from flowing thereinto. Gas released from the elastomer in the direction of the evaporation chamber 101 results in trapping in the space between the valve element 201 and the metallic sealing member 203. In addition, as the pressure of the space between the valve element 201 and the sealing member 203 is not excessively heightened within a short period of time, flow of gas released from the elastomer sealing member 304 into the evaporation chamber 101 can be neglected.

EXPERIMENT 1

In order to confirm the effects of the vacuum valve of the present invention, using the evaporation apparatus shown in FIG. 1, the amount of gas released when the inside of the evaporation chamber 101 was evacuated from atmospheric pressure was measured in accordance with a throughput method.

Specifically, as the apparatus, there was used an apparatus in which an orifice is built in the boundary between the evaporation chamber 101 and the vacuum pump 115 and a pressure gage is connected between the orifice and the vacuum pump 115.

The throughput method is a released gas measuring method using the undermentioned equation (ii) given based on the conventional equation (i) to be used for supplying a pressure.

$$P = Q/S + P' \quad (i)$$

$$Q = (P - P') \times S \quad (ii)$$

Wherein, Q is an amount of gas obtained from the evaporation chamber 101, P is a pressure from the pressure gage 116, and P' is a pressure from the pressure gage connected between the orifice and the vacuum pump 115. S is a conductance of the orifice. More particularly, S is a coefficient that the conductance of the vacuum pump is represented by the orifice having a conductance being far smaller than the conductance of the pump in order to avoid an influence caused due to a change in the conductance of the pump which will be caused due to a variation in the pressure.

In this measurement, there were used 3l/sec in conductance for the orifice and 300 l/sec in conductance for the vacuum pump. The measurement of pressure was performed by using a B - A gage.

Concrete measurements were performed about the following three items.

(1) Measurement of gas released in the treating chamber when the opening where the vacuum valve being built in was sealed by a conflat flange and the vacuum valve was not present.

(2) Measurement of gas released in the treating chamber when an elastomer seal valve comprising a fluorine contained rubber (VITON : trademark name) as the known vacuum valve was used.

(3) Measurement of gas released in the evaporation chamber 101 in which the vacuum valve of the present invention was used and it was made to be in the second seal state (only the metallic sealing member 203 in a closure state).

In the measurement of each of the above (2) and (3), the substrate supplying chamber 100 was also evacuated at the same time. The measured results were shown in FIG. 8.

Figure 8:
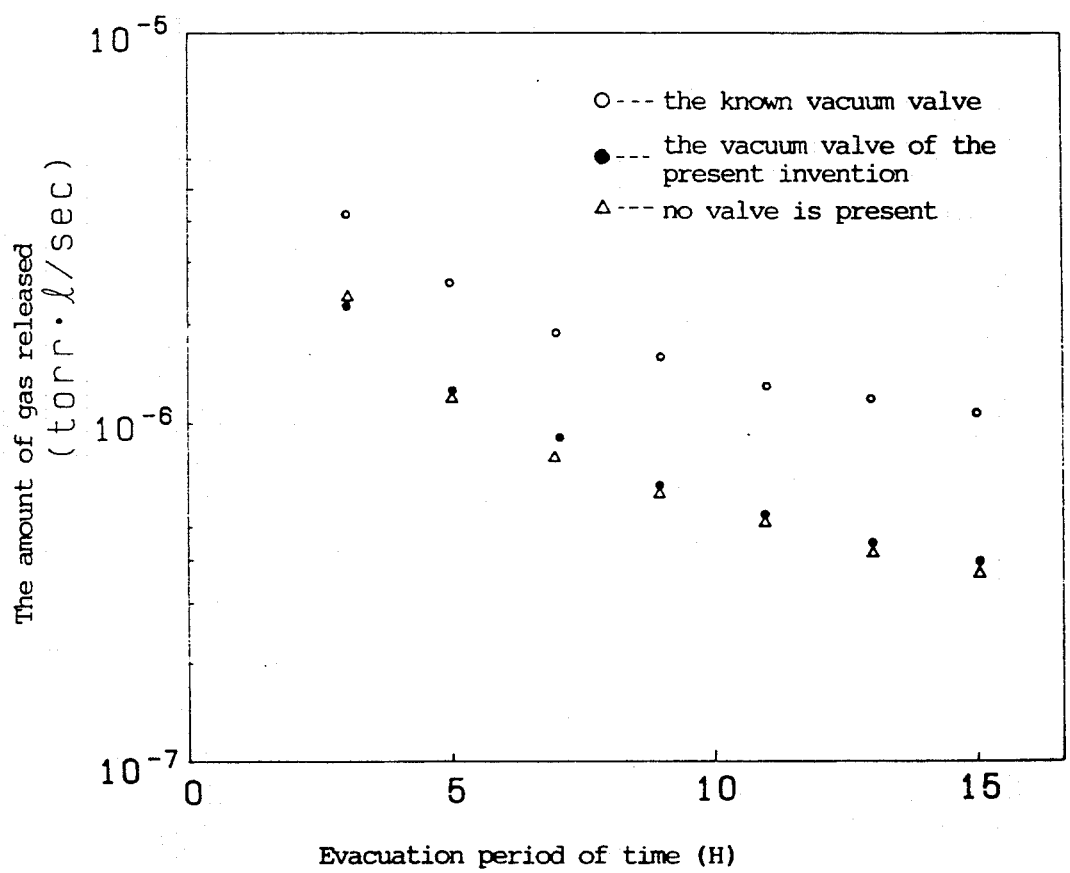
FIG. 8 is a graph showing the amounts of gases released in the vacuum vessel in the case of using the vacuum valve of the present invention.

From the results shown in FIG. 8, it was confirmed that in the case of using the vacuum valve of the present invention, gas release from the elastomer is substantially prevented because of the metal seal by the metallic sealing member 203.

EXPERIMENT 2

Using the vacuum evaporation apparatus shown in FIG. 1, there was formed a Si film on a Si single crystal substrate. Then, the amount of carbon atoms contained in the Si film was measured by SIMS.

Firstly, the substrate supplying chamber 100 and the evaporation chamber 101 were evacuated to provide a vacuum degree of $1 \times 10^{-6}$ Torr and a vacuum degree of $1 \times 10^{-8}$ Torr respectively by using the vacuum pumps 104 and 105.

In this case, the vacuum valve 200 to isolate the substrate supplying chamber 100 from the evaporation chamber 101 was adjusted to be in the second seal state wherein the elastomer sealing member 204 being in an open state and the metallic sealing member 203 being in a closure state.

Successively, an ion pump (400 l/sec) was connected to the evaporation chamber 101. The evaporation chamber 101 was evacuated for 20 hours while baking its inside at 150° C. by a heater (not shown).

The baking by the heater was terminated, and the evacuation was continued for 48 hours to cool to room temperature. Liquid nitrogen was flown into a shroud (not shown) provided on the inner wall of the evaporation chamber 101 and it was circulated. At the same time, the holder having a wafer thereon was heated to 900° C. by the heater 117.

A titanium sublimation pump was connected to the evaporation chamber 101, and evacuation was started. The pressure in the evaporation chamber 101 at this time was $8 \times 10^{-11}$ Torr. A power of 2.5 kW was applied to the electron gun of 3 kW in maximum output power and idling was performed for 15 minutes. Thereafter, the power of the electron gun was reduced to 1.8 kW. Then, the vacuum valve was opened to establish a connection state between the evaporation chamber 101 and the substrate supplying chamber 107. The Si substrate 110 was set to the substrate holder 111 in the evaporation chamber 101. The vacuum valve 200 was adjusted to be in the second seal state (only the metallic sealing member 203 in a closure state) and was evacuated for 20 minutes. The pressure in the evaporation chamber 101 was $1.5 \times 10^{-10}$ Torr.

Then, the shutter 112 was opened and deposition of a Si film on the Si substrate was started. Film formation was carried out while referring to the film thickness measuring device 109 and regulating the power of the electron gun 114 to form a 100 Å thick Si layer.

Opening the vacuum valve 200, the Si substrate 110 was returned to the substrate supplying chamber 100. And the vacuum valve 200 was adjusted to be in the second seal state (only the metallic sealing member in a closure state). When the temperature of the Si substrate 110 was lowered, the vacuum valve was adjusted to be in the first seal state, and the Si substrate was taken out from the substrate supplying chamber 100 outside the system.

The Si substrate 110 was transferred into a SIMS analyzer wherein the concentration of carbon atoms in the Si deposited film was measured. Prior to the measurement, the surface of the Si epitaxial deposited layer was subjected to Ar+ ion sputtering (voltage : 3 kV, for 3 seconds) to eliminate influences by molecules in the atmospheric air.

As a result of the measurement, the concentration of carbon atoms contained in the Si deposited layer was $4.7 \times 10^{15}/cm^3$.

COMPARATIVE EXPERIMENT 1

The procedures of Experiment 2 were repeated except for using a vacuum valve having a sealing member comprising a known elastomer sealing member instead of the vacuum valve used in Experiment 2. As the elastomer sealing member, there was used a fluorine contained rubber (VITON : trademark name). In this experiment, the same procedures as those in Experiment 2 were tried to perform, but the inside of the evaporation chamber could not be reduced as much as in the case of Experiment 2. In fact, the pressure when evacuated by the titanium sublimation pump was $2 \times 10^{-10}$ Torr in this comparative experiment, whereas that in Experiment 2 was $2 \times 10^{-10}$ Torr.

As a result of analyzing the Si film formed, the concentration of carbon atoms was $1.3 \times 10^{16}/cm^3$.

EXPERIMENT 3 AND COMPARATIVE EXPERIMENT 2

Figure 9:
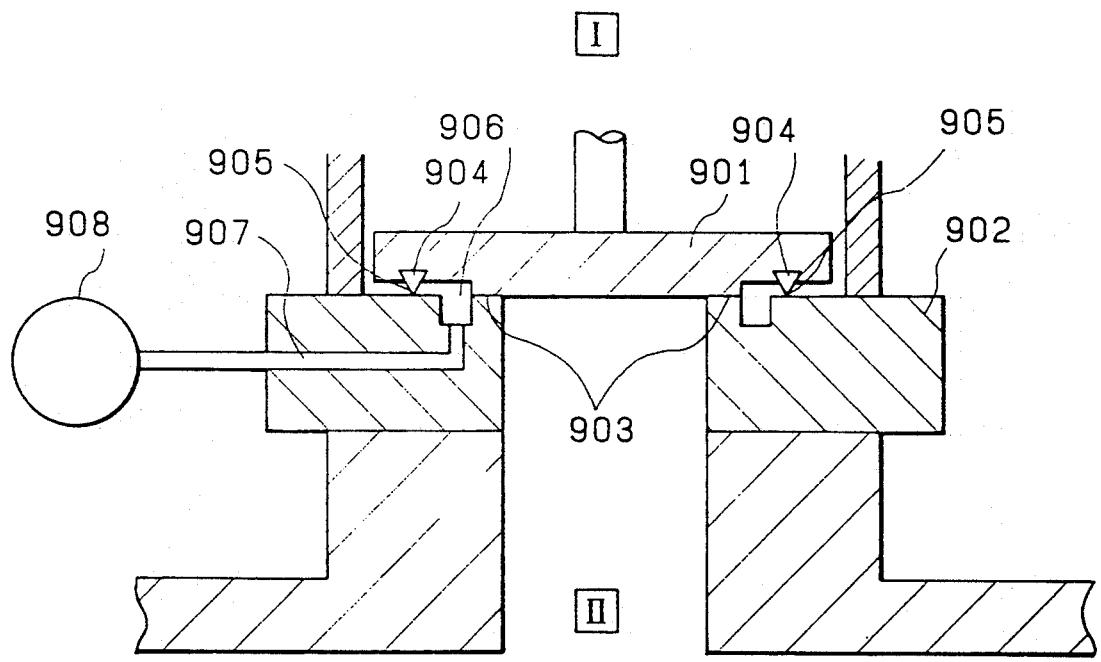
FIG. 9 is a schematic view of a known vacuum valve.
Figure 10:
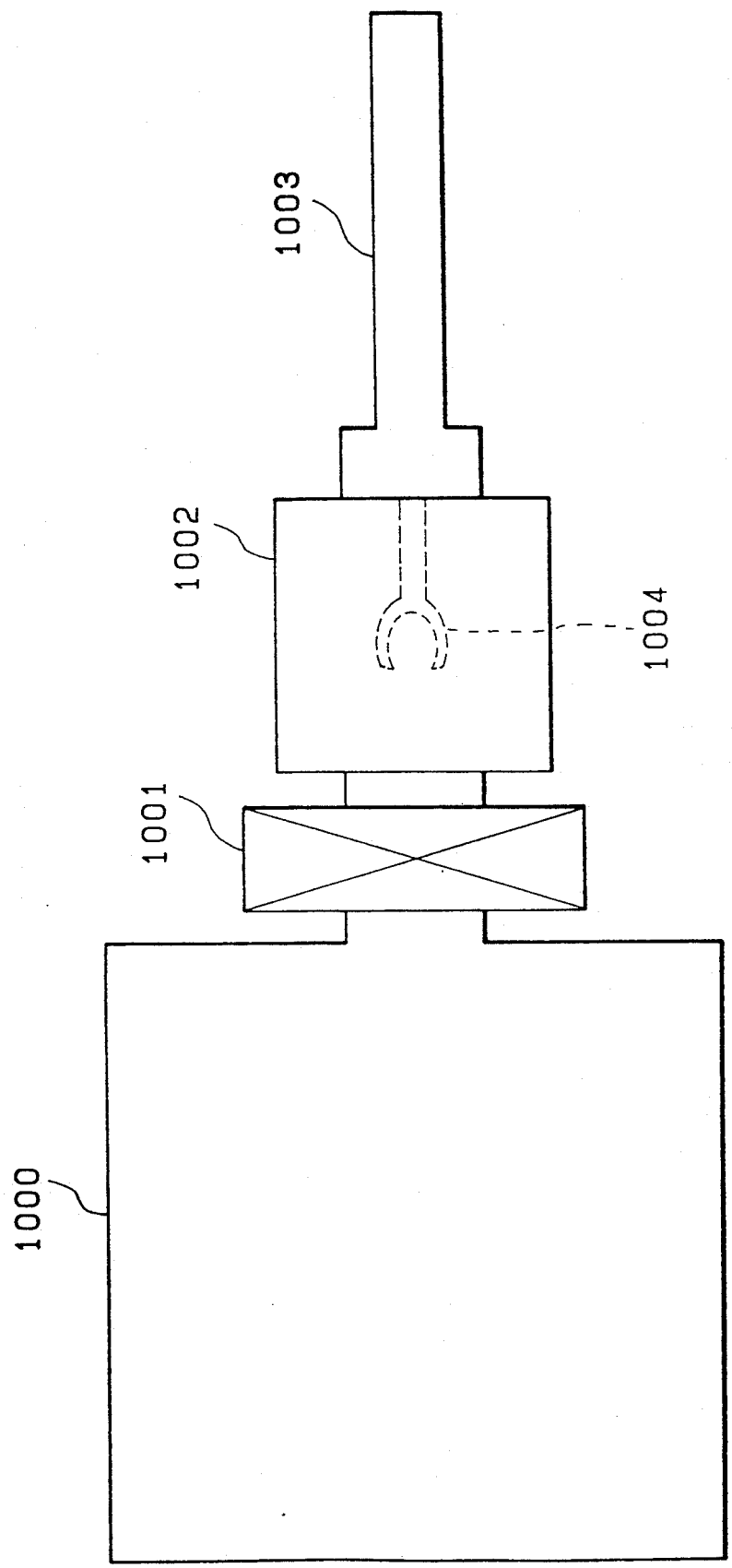
FIG. 10 is a schematic view illustrating a known vacuum treating apparatus.

The procedures of Experiment 2 were repeated 100 cycles in the case of using the vacuum valve of the present invention and in the case of using the known vacuum valve shown in FIG. 9.

As for the vacuum valve used, the size of the vacuum valve shown in FIG. 9 was made to be substantially equivalent to that of the vacuum valve of the present invention. Specifically, the caliber of the valve was made to be 4 inches, and the valve element and the valve seat were constituted by stainless steel (SUS 316L).

As for the elastomer seal, both the vacuum valve of the present invention and the vacuum valve shown in FIG. 9 were constituted respectively by a fluorine contained rubber (VITON : trademark name). Specifically, there was used an O-ring of 4 mm in thickness and 119 mm in inside diameter with respect to the vacuum valve of the present invention. With respect to the vacuum valve shown in FIG. 9, there was used an angular O-ring as shown in FIG. 9 which is of 8 mm in width, 2.7 in nose R and 137 mm in inside diameter.

As the passageway 907 shown in FIG. 9, a hole of 5 mm in size was provided, and as the vacuum pump 908, there was used a turbo-molecular pump of 100 l/sec.

In the case of the known vacuum valve shown in FIG. 9, deformation and deterioration started causing from 50 th cycle due to heat by the elastomer sealing member 904 wherein deterioration of airtightness was also caused. As a result, in order to bring the evaporation chamber to a reduced pressure, it took an evacuation period as much as 2 to 3 holds over that in the case of using the vacuum valve of the present invention.

This is considered due to that in the vacuum valve of FIG. 9, deterioration was hastened because of the elastomer sealing member 904 being always compressed and in addition to this, the position of the elastomer sealing member was unavoidably decided by the metal seal 903. On the other hand, in the case of the vacuum valve of the present invention, the elastomer seal was compressed with a substantially constant pressure and because of this, such deterioration of airtightness was not caused.

We claim:

1. A vacuum valve for use in a vacuum treating apparatus, comprising:
   a valve element for sealing an open space;
   a first sealing member supported by said valve element and in contact with a low pressure side of the open space, said first sealing member being composed of an inorganic material;
   a second sealing member supported by said valve element and in contact with a high pressure side of the open space, said second sealing member being composed of an elastomer, wherein the sealing state of said valve element is adjustable in two steps such that said first sealing member and said second sealing member are closed in the first sealing step and said first sealing member is closed and said second sealing member is open in the second sealing step, and wherein a first pressure difference between the pressure on the low pressure side and the pressure on the high pressure side in the first sealing step is controlled to be smaller than a second pressure difference between the pressure on the low pressure side and the pressure on the high pressure side in the second sealing step.

2. The vacuum valve according to claim 1, wherein said inorganic material of said first sealing member is composed of either one of a metal and a ceramic.

3. The vacuum valve according to claim 1, wherein said elastomer of said second sealing member is composed of either one of a fluorine-contained rubber and a NBR rubber.

4. A vacuum treating apparatus, comprising:
   a first vacuum vessel having a first pressure;
   a second vacuum vessel capable of having a second pressure higher than the first pressure;
   a vacuum valve connected to said first vacuum vessel and said second vacuum vessel, said vacuum valve being capable of opening and closing a space between said first vacuum vessel and said second vacuum vessel;
   driving means for driving said vacuum valve between an open and closed position,
   said vacuum valve comprising a first sealing member in contact with space within said first vacuum vessel and a second sealing member in contact with space within said second vacuum vessel, said first sealing member being composed of an inorganic material and said second sealing member being composed of an elastomer, wherein the sealing state of said vacuum valve is adjustable in two steps such that said first sealing member and said second sealing member are closed in the first sealing step and said first sealing member is closed and said second sealing member is open in the second sealing step, and wherein a first pressure difference between pressure on a low pressure side and pressure on a high pressure side in the first sealing step is controlled to be smaller than a second pressure difference between the pressure on the low pressure side and the pressure on the high pressure side in the second sealing step.

5. The vacuum treating apparatus according to claim 2, wherein said inorganic material of said first sealing member is composed of either one of a metal and a ceramic.

6. The vacuum treating apparatus according to claim 2, wherein said elastomer of said second sealing member is composed of either one of a fluorine-contained rubber and a NBR rubber.

* * * * *

UNITED STATES PATENT AND TRADEMARK OFFICE
CERTIFICATE OF CORRECTION

PATENT NO. : 5,170,990
DATED : December 15, 1992
INVENTOR(S) : Osamu Kamiya, et al.

It is certified that error appears in the above-indentified patent and that said Letters Patent is hereby corrected as shown below:  On the title page: Item

[56] REFERENCES CITED:

FOREIGN PATENT DOCUMENTS, "132890  11/1978  Fed. Rep. of Germany" should read --132890  11/1978  Dem. Rep. of Germany--.

COLUMN 6:

Line 22, "$Q=4.3 \times 10^{-10}$ Torr.l/sec." should read --$Q=4.3 \times 10^{-13}$ Torr.l/sec.--.

COLUMN 11:

Line 24, "3l/sec" should read --3 l/sec--.

Signed and Sealed this

Eighth Day of February, 1994

Attest:

BRUCE LEHMAN

*Attesting Officer*         *Commissioner of Patents and Trademarks*